March 7, 1950      L. FREEMAN      2,500,065
CLARIFICATION OF SETTLING LIQUORS
Filed Nov. 23, 1945
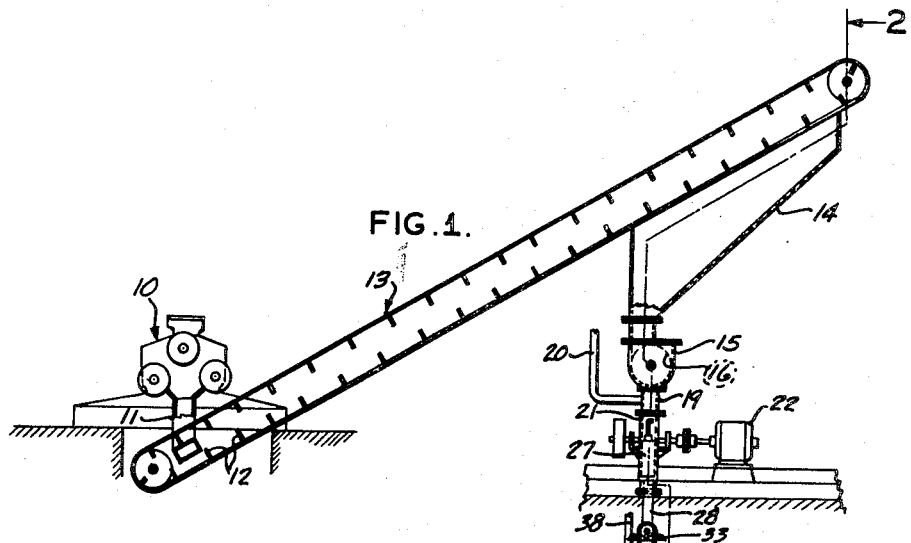
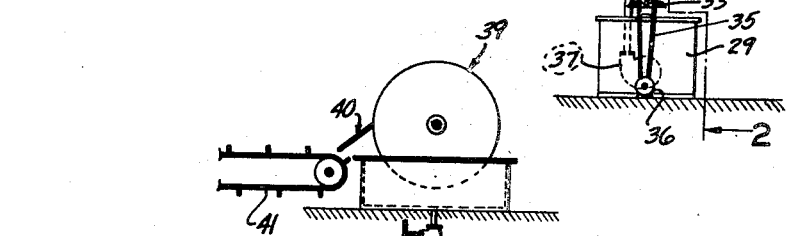
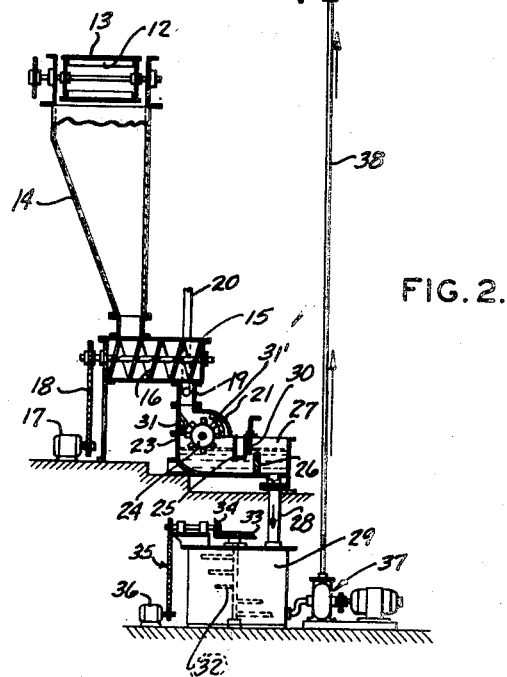
INVENTOR
LEO FREEMAN
ATTORNEY Patented Mar. 7, 1950

2,500,065

UNITED STATES PATENT OFFICE 2,500,065

CLARIFICATION OF SETTLING LIQUORS

Leo Freeman, Baton Rouge, La., assignor to Gruendler Crusher and Pulverizer Company, St. Louis, Mo., a corporation of Missouri Application November 23, 1945, Serial No. 630,460

7 Claims. (Cl. 127—55)

This present invention relates in general to certain new and useful improvements in apparatus and processes for treating settling liquor from raw sugar juice and, more particularly, to apparatus and methods for the filtration of such liquors that improves clarification.

It is well known that the settlings from sugar juice in sugar cane is commonly extracted by an established method of clarification of juice extracted in a series of mills, and by the use of water sprayed onto the cane, so that the juice is collected in the form of a sugar liquor solution. The sugar liquor solution is then settled, and clarified to remove various impurities, and thereby produce a clear sugar liquor which can be evaporated and reduced to crystalline form. Because of the highly colloidal nature of some impurities in cane juice or raw sugar liquor, it has become accepted practice to employ specially compounded artificial filter aids, but such filter aids are expensive, become dissolved in or entrained with the raw sugar liquor to some extent, and are of very limited efficiency.

It is also well known that the cane residue material, or bagasse as it is called in the art, retains some residual sugar juice, but because of the difficulty in further processing this material it is generally considered uneconomical to attempt recovery. Thus, the bagasse, as it comes from the crushing mills, is considered a waste product and at present is utilized by incorporation in wallboard, or is consumed as a fuel.

Accordingly, an object of the persent invention resides in the further treatment and processing of sugar-bearing residue material, such as bagasse, to facilitate and render more complete the recovery of its sugar content.

It is also an object of the present invention to provide a process of treating material such as bagasse so that the same may be useful as a filter aid with consequent improvement in the character and efficiency of filtering equipment.

A further object is to be found in the provision broadly of certain items of apparatus which will carry out the teachings of the invention to the extent envisioned in and pointed out by the following description thereof.

Other objects of a more specific nature and the advantages to be attained thereby will appear in the course of the detailed explanation concerning the process and apparatus as it is presently preferred.

In the drawings:

Figure 1 is a general schematic view of the apparatus in side elevation with certain items thereof inicated in section for purposes of clear disclosure; and Figure 2 is a sectional view of the apparatus taken along the line 2—2 in Figure 1.

In accordance with the objects set forth bagasse, which has been processed at least to the stage at which it is heretofore normally considered waste matter, is deposited in a hopper and fed into a conventional power-operated type transfer device which, in turn, conveys the bagasse to an homogenizer. At the same time, the settling liquor resulting from the clarification of the raw juice, which settling liquor is commonly referred to in the industry as "mud," is fed into the homogenizer, the settling liquor or "mud" and bagasse being thus simultaneously intermixed so that all the particles of bagasse are reduced to a finely divided state and are thoroughly dispersed through the liquor in the provision of a labile mechanical suspension or slurry. When the slurry is sufficiently homogenized, it is permitted to flow in properly regulated quantities to a holding tank where, under continual agitation, the slurry is then pumped to a filter for the extraction of residual sugar and the filtrate is drawn off for subsequent processing and conversion to crystalline form. The bagasse and other solids from the filter are discarded.

By way of example, the above described process may be carried out in a continuous manner with the aid of apparatus shown in the several views of the drawing. Accordingly, the bagasse as it issues from the cane crushing mills 10, falls through a chute 11 onto the flights 12 of an endless belt type elevating conveyor 13 and is deposited in a hopper 14. The hopper 14 directs the bagasse, by gravity, into a transfer device 15 in which a screw conveyor 16 is operatively mounted and is driven by means of a motor 17 connected thereto through a suitable sprocket and chain mechanism 18. The bagasse discharges from the conveyor 16 into a conduit 19, into which settling liquor, or so-called "mud," is introduced from feed line 20, conventionally connected to a settling tank (not shown). The "mud" and bagasse together flow into a high speed homogenizer or rotary beater 21, driven by a direct-connected electric motor 22, as best seen in Figure 1.

The homogenizer 21 preferably includes an outer shell or casing 23, having a hammer-mill type rotor 24 with spaced upper and lower internal baffle members 25 and 26, respectively, so that the bagasse may be fully dispersed in the liquor and will not tend to settle or stratify during passage therethrough into the discharge tank compartment 27, from which the slurry is discharged by gravity through conduit 28 to the holding tank 29. The flow of the slurry into the holding tank 29 is regulated by a gate member 30 which controls the passage or area of opening between the baffle members 25 and 26. It is also important to note that lower baffle 26 will act to maintain the slurry in the homogenizer shell 23 at such a level as to keep the lower portion of the rotor 24 awash or in contacting relation with the slurry, thereby insuring continual agitation and complete dispersal.

The effectiveness of the rotary beater 24 is considerably improved by the provision of peripherally located and serrated striker means 31 and 31', preferably positioned below conduit 19 and at an angle to the direction of feed so that the same may be directed onto the beater 24. The centrifugal action of the beater 24 will then throw the bagasse and liquor against the adjacent serrated surfaces of the striker means 31, 31', with consequent efficient intermixing thereof. In this way, the bagasse can be forcibly dispersed throughout the sugar liquor to provide the homogenous slurry.

The slurry-holding tank 29 is equipped with an agitator or multiple blade, churn-type rotor 32 driven through suitable gears 33 and 34, operatively associated with a belt and pulley assembly 35 drivingly connected with motor 36. Following the desired period of agitation of the bagasse and liquor in this tank, the slurry is then forced by means of a motor driven centrifugal pump unit 37 through pipe line 38 to a rotary filter means 39 which may be of the rotating drum type, and the liquor solution filtered out. The bagasse and such solid impurities retained therein may be removed from the surface of the filter cloth by means of a suitable scraper member 40 and the same deposited in a conveyor generally indicated at 41.

While the slurry is retained in the holding tank 29, the liquor thoroughly contacts the finely ground and dispersed particles of bagasse with the consequent effect of imbibing as much of the residue sugar juices as possible. This action of the liquor is further promoted and improved by constantly agitating and circulating the slurry to prevent the mechanical separation of the solid particles of bagasse. It has been found in actual practice that the finely divided bagasse which is ground up intimately into the raw sugar liquor or homogenized therein, results in startlingly improved filtration efficiency. The filters can be operated at much higher flow rates and the mass of filter residue through which the liquid passes is much more uniformly pervious to the passage of liquid, and at the same time is more effective in retaining the suspended foreign matter which is to be filtered out.

Of course, it should be understood that the invention may include certain modifications in the steps of the method and in the character of the several items of apparatus herein pointed out and shown, all as will come within the scope of the claims hereafter appearing.

Having thus described my invention, what I claim and desire to secure by Letters Patent is:

1. The process of treating mud resulting from the settling of sugar liquor which comprises introducing to a stream of the mud a quantity of fibrous residue resulting from initial extraction of such liquor, homogenizing the mud and residue to form a slurry, and thereupon filtering the slurry to produce a clarified liquor.

2. The process of treating mud resulting from the settling of sugar liquor which comprises introducing into a stream of the mud a quantity of fibrous residue resulting from the initial extraction of such liquor, beating the mud and residue material into an homogenous slurry mixture, and thereupon filtering the slurry to produce a clarified liquor.

3. The process of treating mud resulting from the settling of sugar liquor which comprises introducing into the mud a quantity of bagasse, thoroughly homogenizing the mud and bagasse to form a slurry, and thereupon filtering the slurry to produce a clarified liquor.

4. The process of treating mud resulting from the settling of sugar liquor which comprises introducing into a stream of the mud a quantity of bagasse, beating the mud and bagasse into an homogenous slurry mixture, and thereupon filtering the slurry.

5. The process of treating mud resulting from the settling of sugar liquor which comprises introducing bagasse into a stream of the mud, beating the bagasse into an homogenous mixture with the mud to form a slurry, removing the homogenous slurry to a holding tank, continuously agitating the slurry in the holding tank to remove residual sugar in the bagasse by contact with the mud, and filtering the mud out of the slurry.

6. The process of treating mud resulting from the settling of sugar liquor which comprises introducing bagasse into a stream of mud, mechanically mixing and homogenizing the bagasse and the mud, holding the bagasse in suspension in the mud to insure intimate contact between the particles and the mud, and filtering the mud out of such suspension.

7. The process of treating mud resulting from the settling of sugar liquor which comprises introducing to a stream of the mud a quantity of fibrous residue resulting from initial extraction of such liquor, homogenizing the mud and residue to form a slurry, and thereupon filtering the slurry to produce a clarified liquor.

LEO FREEMAN.

REFERENCES CITED

The following references are of record in the file of this patent:

UNITED STATES PATENTS

| Number | Name | Date |
|---|---|---|
| 220,970 | Frambach | Oct. 28, 1879 |
| 689,838 | Williams | Dec. 24, 1901 |
| 1,369,180 | Lindenberg | Feb. 22, 1921 |
| 1,646,762 | Morgan | Oct. 25, 1927 |
| 2,307,326 | Lissaur | Jan. 5, 1943 |

OTHER REFERENCES

"Cane Sugar Handbook," Spencer, 8th ed., N. Y., 1945, pages 123–4.

Facts About Sugar, May 1933, pages 211–213.

"Filtration With Filter-Cel," Celite Products Co., N. Y.

"Bentonite," Tech. and Ind. Uses, American Colloid Co., Chicago, Ill. (Copyrighted 1940.) Data 204.